(12) United States Patent
Ji et al.

(10) Patent No.: US 9,057,841 B2
(45) Date of Patent: Jun. 16, 2015

(54) WAVELENGTH DIVISION MULTIPLEXING

(75) Inventors: Guijun Ji, Cupertino, CA (US); Yanlin Sun, Guangdong (CN)

(73) Assignee: Oplink Communications, Inc., Fremont, CA (US)

(*) Notice: Subject to any disclaimer, the term of this patent is extended or adjusted under 35 U.S.C. 154(b) by 1302 days.

(21) Appl. No.: 12/811,516

(22) PCT Filed: Jan. 3, 2008

(86) PCT No.: PCT/CN2008/000024
§ 371 (c)(1),
(2), (4) Date: Mar. 4, 2011

(87) PCT Pub. No.: WO2009/086686
PCT Pub. Date: Jul. 16, 2009

(65) Prior Publication Data
US 2011/0182586 A1    Jul. 28, 2011

(51) Int. Cl.
*H04J 14/02* (2006.01)
*G02B 6/293* (2006.01)
*G02B 6/32* (2006.01)

(52) U.S. Cl.
CPC ......... *G02B 6/2937* (2013.01); *Y10T 29/49826* (2015.01); *G02B 6/2938* (2013.01); *G02B 6/32* (2013.01)

(58) Field of Classification Search
CPC ...... G02B 6/2937; G02B 6/2938; G02B 6/32; G02B 6/29374; G02B 6/29382; G02B 6/322; G02B 6/255; G02B 6/26; G02B 6/262; G02B 6/264; G02B 6/2746; G02B 6/2817; G02B 6/2821; G02B 6/2848; G02B 6/29332; G02B 6/29361; G02B 6/2804; G02B 6/293; G02B 6/29368; G02B 6/34; G02B 6/36; G02B 6/42; G02B 6/46; H04J 14/02; H04J 14/0209; H04J 14/00; H04B 10/12; B23P 11/00; Y10T 29/49826

USPC ........................................ 398/79–102; 385/31
See application file for complete search history.

(56) References Cited

U.S. PATENT DOCUMENTS 6,710,330 B1 *  3/2004  Tagami et al. ................. 250/234
6,729,770 B2 *  5/2004  Brun et al. ....................... 385/60
(Continued)

FOREIGN PATENT DOCUMENTS

CN          1427557         7/2003
CN          2706966         6/2005

OTHER PUBLICATIONS

Chinese Office Action dated Jul. 3, 2012 from related Chinese Application No. 200880127469.4, 24 pages.
(Continued)

*Primary Examiner* — M. R. Sedighian
(74) *Attorney, Agent, or Firm* — Fish & Richardson P.C.

(57) ABSTRACT

Technologies relating to wavelength division multiplexing are provided. In one implementation, a wavelength division multiplexing (WDM) coupler is provided. The WDM coupler includes an input block including a first tube, the first tube holding an input dual fiber pigtailed capillary, the capillary holding an input fiber and a reflection fiber, a center block including a center tube holding a first inner tube and a second inner tube, the first inner tube holding a first lens within the first inner tube and the second inner tube holding a second lens within the second inner tube, the center block further including a WDM filter positioned between the first lens and the second lens and secured to the end surface of the first inner tube, and an output block including a second tube holding an output single fiber pigtailed capillary, the capillary holding a transmission fiber.

18 Claims, 6 Drawing Sheets

(56) References Cited

U.S. PATENT DOCUMENTS

| | | | |
|---|---|---|---|
| 6,876,491 B2* | 4/2005 | Li et al. | 359/341.32 |
| 7,454,143 B1* | 11/2008 | Wu et al. | 398/85 |
| 8,538,209 B1* | 9/2013 | Li | 385/31 |
| 2006/0182390 A1* | 8/2006 | Ji | 385/31 |
| 2007/0154218 A1* | 7/2007 | Sommer | 398/85 |
| 2011/0112409 A1* | 5/2011 | Milner et al. | 600/478 |

OTHER PUBLICATIONS

Chinese Office Action dated Mar. 4, 2013 from related Chinese Application No. 200880127469.4, 8 pages.

Chinese Office Action dated May 21, 2014 from related Chinese Application No. 200880127469.4, 5 pages.

* cited by examiner

WAVELENGTH DIVISION MULTIPLEXING

BACKGROUND

This specification relates to wavelength division multiplexing.

Conventional wavelength division multiplexing ("WDM") allows a single optical fiber to transmit a signal having multiple light streams where each light stream can have a different wavelength. Carrying multiple light streams of different wavelengths increases the bandwidth of the signal where the total bandwidth is the sum of the bandwidth provided by each individual wavelength.

Typically, to combine multiple light streams (e.g., eight individual light streams with wavelengths λ1, λ2, λ3, λ4, λ5, λ6, λ7, and λ8, respectively), individual light streams are incrementally combined to form a single signal including the wavelengths of all (e.g., eight) individual light streams. For example, light streams with wavelengths λ1 and λ2, respectively, are combined to form a single light signal including the two wavelengths, λ1 and λ2. Similarly, the light signal having wavelengths λ1 and λ2 is again combined with the third light stream including wavelength λ3 to form a single light signal including three wavelengths λ1, λ2, and λ3. This process of adding light streams is repeated until a single light signal including eight wavelengths λ1, λ2, λ3, λ4, λ5, λ6, λ7, and λ8 is formed. The resulting light stream having multiple wavelengths is typically referred to as a wavelength division multiplexed signal.

Additionally, a wavelength division multiplexed signal can also be decomposed to form one or more light streams, each including one or more wavelengths. Decomposing a multiplexed signal is typically referred to as demultiplexing. Conventional demultiplexing is the reverse process of multiplexing. The multiplexed signal, which, for example, is a single light stream including eight wavelengths λ1, λ2, λ3, λ4, λ5, λ6, λ7, and λ8, is directed to a filter. The filter transmits light having a single wavelength, for example λ1, and reflects light, including wavelengths other than λ1. Consequently, when the multiplexed light stream including wavelengths λ1, λ2, λ3, λ4, λ5, λ6, λ7, and λ8 is incident onto a filter of λ1, the filter passes a light stream including wavelength λ1, and reflects a second multiplexed light stream, which includes only seven wavelengths: λ2, λ3, λ4, λ5, λ6, λ7, and λ8.

A conventional demultiplexing device typically has three ports. The multiplexed signal including multiple wavelengths is input into the first port. The second port outputs the light stream passed by the filter (e.g., having only one wavelength λ1), and the third port outputs the light stream reflected from the filter (e.g., having seven wavelengths λ2, λ3, λ4, λ5, λ6, λ7, and λ8). Multiple filters arrangements can be used to separate out streams having other wavelengths.

SUMMARY

This specification describes technologies relating to wavelength division multiplexing.

In general, in one aspect, a wavelength division multiplexing (WDM) coupler is provided. The WDM coupler includes an input block including a first tube, the first tube holding an input dual fiber pigtailed capillary, the capillary holding an input fiber and a reflection fiber, a center block including a center tube holding a first inner tube and a second inner tube, the first inner tube holding a first lens within the first inner tube and the second inner tube holding a second lens within the second inner tube, the center block further including a WDM filter positioned, between the first lens and the second lens and secured to the end surface of the first or second inner tube, and an output block including a second tube holding an output single fiber pigtailed capillary, the capillary holding a transmission fiber. Where the coupler inputs a signal from the input fiber, and outputs the transmitted signal through the transmission fiber and the reflected signal through the reflection fiber.

Implementations of the WDM coupler can include one or more of the following features. The input capillary, the output capillary, the first lens, and the second lens can have different rotational orientations about an optical axis. The first and second lenses can be selected from a group consisting of C-lens, GRIN lens, D-lens, and lenses geometrically configured to fit within the lens holding inner tube. The WDM filter can include a first side including one or more film coatings and a second side and where the first or second side of the WDM filter is secured to the end surface of the first inner tube. The center block can further include an optical component coupled between the WDM filter and the second inner tube. The WDM filter can include a first side including one or more film coatings and a second side and where the first or second side of the WDM filter is secured to the end surface of the second inner tube. The center block can further include an optical component coupled between the first inner tube and the WDM filter. The optical component can be a second WDM filter and/or an optical isolator. The first lens or second lens can include an angle-polished flat surface.

In general, in one aspect, a wavelength division multiplexing (WDM) coupler is provided. The WDM coupler includes an input block including a first tube, the first tube holding an input dual fiber pigtailed capillary, the capillary holding an input fiber and a reflection fiber, a center block including a center tube holding a first lens, a second lens, and a filter assembly, the filter assembly including an inner tube and a WDM filter where the WDM filter is secured to an end surface of the inner tube, the filter assembly positioned between the first lens and the second lens, and an output block including a second tube holding an output single fiber pigtailed capillary, the capillary holding a transmission fiber.

Implementations of the WDM coupler can include one or more of the following features. The input capillary, the output capillary, the first lens, and the second lens can have different rotational orientations about an optical axis. The first lens, the second lens, and the filter assembly can be positioned in the center tube without contacting each other. The filter assembly can further include an optical component; the optical component can be a second WDM filter and/or an optical isolator. The first and second lenses can include an angle-polished flat surface.

In general, in one aspect, a wavelength division multiplexing (WDM) coupler is provided. The WDM coupler includes an input capillary and an output capillary, where the input capillary holds a plurality of input and reflection fibers, and the output capillary holds a plurality of transmission fibers.

Implementations of the WDM coupler can include one or more of the following features. Each set of input, reflection, and output fibers can be in separate planes. The fibers can be substantially in the same plane.

In general, in one aspect, a wavelength division multiplexing (WDM) coupler is provided. The WDM coupler includes an input capillary and an output capillary, where the input capillary holds first and second input fibers and first and second reflection fibers, and the output capillary holds first and second transmission fibers.

Implementations of the WDM coupler can include one or more of the following features. A first input fiber and a first reflection fiber can be in a first plane, and a second input fiber and a second reflection fiber can be in a second plane where the first plane is substantially perpendicular to the second plane. The first transmission fiber can be in a first plane and the second transmission fiber can be in a second plane where the first plane is substantially perpendicular to the second plane. All the fibers can be substantially in the same plane.

In general, in one aspect, a method is provided. The method includes positioning a first lens within a first tube, positioning a second lens within a second tube, securing a filter to an end surface of the first tube or the second tube, and positioning the first tube and the second tube within a center tube including adjusting the relative positions of the first tube and the second tube, the adjusting including rotating the position of the first tube and the second tube to distinct orientations relative to an optical axis.

Particular embodiments of the subject matter described in this specification can be implemented to realize one or more of the following advantages. A WDM coupler can be assembled and aligned. After alignment, the components can be secured using a UV cured epoxy at, for example, room temperature such that the alignment is unaffected by the securing of the components. The WDM coupler can be further treated by heating to a specified predetermined temperature (e.g. 110 degrees Celsius) after assembly, which provides a WDM coupler that is stable over a variety of temperatures and humidity conditions resulting in an athermal platform optical device.

Separate components of the WDM coupler can be rotated relative to one another in order to reduce the walk-off effect to substantially minimize insertion loss and allowing for the use of components having angled surfaces (e.g., capillaries and C-lenses with polished angle surfaces).

The WDM coupler can use components formed from materials having a similar coefficient of thermal expansion (CTE) in order to reduce thermal dependent loss (TDL).

Concentric components of the WDM coupler can be aligned and fixed using an epoxy wicking such that the epoxy is prevented from spreading over or diffusing into the optical paths of the WDM coupler. The WDM coupler provides for a large filter (e.g., substantially 1.9×1.9 mm$^2$), which can improve performance of the WDM coupler.

A WDM coupler where a center block including a filter is assembled first followed by input and output blocks can provide high performance and low insertion loss while simplifying manufacturing.

In some implementations, two filters are provided to enhance overall filtering performance of the WDM coupler relative to a single filter. Additionally, in other implementations, an isolator is included in the WDM coupler to reduce cost and space requirements relative to an external isolator. Furthermore, additional optical fibers can be included in a WDM coupler having a single WDM filter.

Securing lenses of the WDM coupler within individual glass tubes improves manufacturing and performance. For example, a glass tube with precise inner radius is easier to manufacture as compared with a tube with end surface precisely perpendicular to a body of the tube. Accordingly, the lens will be better held (i.e., better alignment and stronger attachment) inside the glass tube as compared with fixing the lens at the end of the tube.

A WDM coupler can be assembled in an order that simplifies manufacture while providing a high performance, low insertion loss device. For example, an input block and an output block can be secured to an assembled and aligned center block, with only fine tuning of an active alignment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
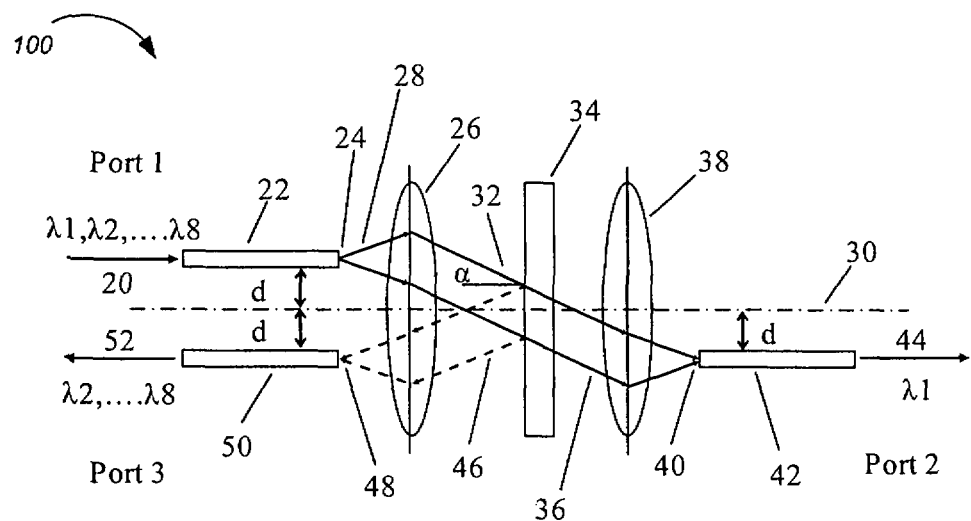
FIG. 1 is a block diagram of an example conventional demultiplexing device.

FIG. 1 is a block diagram of an example conventional demultiplexing device 100. The demultiplexing device 100 includes first fiber 22, second fiber 42, third fiber 50, first lens 26, second lens 38, and filter 34.

A first port is coupled to the first fiber 22, a second port is coupled to the second fiber 42, and a third port is coupled to the third fiber 50. The first fiber 22 and the third fiber 50 are optically coupled to the first lens 26. Similarly, the second fiber 42 is optically coupled to the second lens 38. The filter 34 is optically coupled between the first lens 26 and the second lens 38.

A multiplexed signal 20 having eight wavelengths $\lambda 1$, $\lambda 2$, $\lambda 3$, $\lambda 4$, $\lambda 5$, $\lambda 6$, $\lambda 7$, and $\lambda 8$ can be input into the first fiber 22 through the first port (referred to as common port). The multiplexed signal 20 exits the first fiber 22 from a fiber end 24 of the first fiber 22, which is on a front focal plane of the first lens 26. Thus, a light beam 28 carrying the multiplexed signal 20 exiting from the first fiber 22 can be collimated by the first lens 26. In some implementations, the fiber end 24 can be positioned at a specified distance d from an optical axis 30 of the first lens 26. Consequently, the light beam 28 passes through the first lens 26 exiting as collimated light beam 32, which is angled relative to the optical axis 30. For example, the collimated light beam 32 forms an angle $\alpha$ with the optical axis 30.

The filter 34 can be configured to pass a light beam of a specified wavelength (e.g., $\lambda 1$) that is incident at specified incident angle (e.g., $\alpha$). In some implementations, the filter 34 can be formed by coating multiple thin films on a substrate (e.g., glass) to generate a thin film filter (TFF). Since the collimated light beam 32 is incident onto the filter 34 with incident angle $\alpha$, the filter 34 can pass a portion of collimated light beam 32 having a wavelength $\lambda 1$, which becomes filtered collimated light beam 36. The filtered collimated light beam 36 can be focused by the second lens 38 onto a fiber end 40 of the second fiber 42.

In some implementations, the lenses 26 and 38 can be identical and coaxial such that the fiber end 40 is on a back focal plane of the second lens 38 and at a same distance d from optical axis 30. However, other configurations of the first and second lenses 26 and 28 are possible. Finally, a light stream 44 including wavelength $\lambda 1$ can exit from the second fiber 42 through the second port (referred to as a transmission port).

The remainder of the collimated light 32 incident onto the filter 34 is reflected by the filter 34 with a reflection angle $\alpha$. Since the portion of the collimated light 32 including wavelength $\lambda 1$ is transmitted through the filter 34, a reflected collimated light 46 includes seven wavelengths $\lambda 2$, $\lambda 3$, $\lambda 4$, $\lambda 5$, $\lambda 6$, $\lambda 7$, and $\lambda 8$. The reflected collimated light 46 can be focused by the first lens 26 onto a fiber end 48 of the third fiber 50, which can be positioned on a same plane with the fiber end 24, and at a same distance d from the optical axis 30 but on an opposite side across the optical axis 30. A light stream 52 including wavelengths $\lambda 2$-$\lambda 8$ can then exit from the third fiber 50 through the third port (referred to as a reflection port).

The demultiplexing device 100 can also be configured as a multiplexing device. For example, a first light stream of wavelength $\lambda 1$ can be input into the second port. Additionally, a second light stream including a single wavelength ($\lambda 2$) or multiple wavelengths ($\lambda 2$, $\lambda 3$, $\lambda 4$, $\lambda 5$, $\lambda 6$, $\lambda 7$, and $\lambda 8$) can be input from the third port. The first light stream passes through the filter while the second light stream is reflected from the filter. Consequently, a multiplexed light stream having wavelengths $\lambda 1$ and $\lambda 2$ or $\lambda 1$-$\lambda 8$ can be output from the first port. Though reference is made to a composite signal that includes eight separate wavelengths, other numbers of signals can be combined in the source stream (e.g., at least two).

Figure 2:
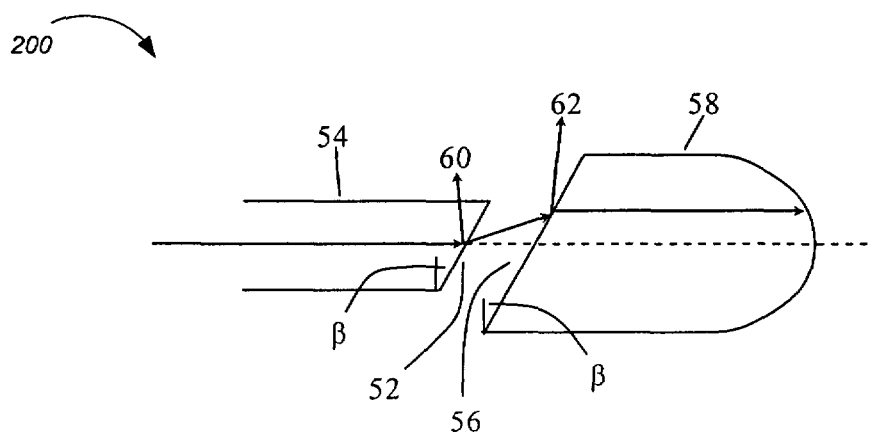
FIG. 2 is a block diagram of example lens and fiber end surfaces.

FIG. 2 is a block diagram of example lens and fiber end surfaces 200. Lenses are typically cylindrical in shape (e.g., rod shaped) to conform to a tube-like housing. Additionally, the end face of fibers are typically polished to form a specified polish angle. For example, FIG. 2 shows a fiber 54 having an end face 52. The end face 52 is polished to form polish angle $\beta$ (e.g., substantially equal to eight degrees).

FIG. 2 also shows a lens 58 having a flat surface 56 facing the fiber end face 52. In some implementations, the flat surface 56 of the lens 58 can also be polished to form the same polish angle $\beta$. As a result, partially reflected light 60 at the fiber end 52 and partially reflected light 62 at the lens surface 56 will not propagate back into the fiber 54. By contrast, if fiber end 52 and lens surface 56 have no polish angle (i.e., $\beta=0$), reflected light 60 and 62 can propagate back into fiber 54, and can destabilize a light source at the other end of the fiber 54.

A lens having a surface curvature on one side, an angle-polished flat surface on the other side, and a cylindrical (e.g., rod shaped) shape can be referred to as C-lens.

Additionally the parallel angle-polished surfaces 52 and 56 can cause a primary ray of the light stream from the fiber 54 to be shifted from an optical axis in lens 58. However, since the gap between the fiber end and the lens is very small, the shift of the primary ray can also be very small.

Figure 3:
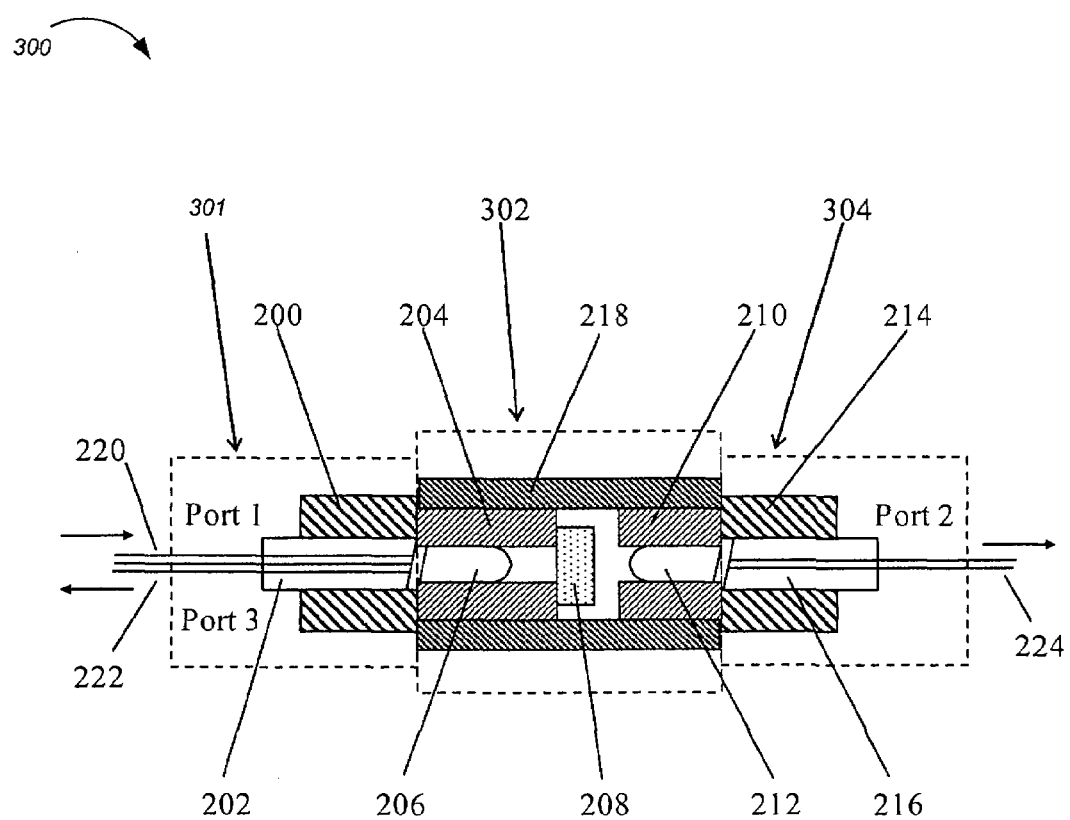
FIG. 3 is a block diagram of an example wavelength division multiplexing (WDM) coupler.

FIG. 3 is a block diagram of an example wavelength division multiplexing (WDM) coupler 300. The term WDM can include both coarse wavelength division multiplexing (CWDM) and dense wavelength division multiplexing (DWDM).

The WDM coupler 300 includes an input block 301, a center block 302, and an output block 304. The input block 301 includes a first glass tube 200 configured to hold a dual fiber pigtailed input capillary 202. The dual fiber pigtailed input capillary 202 can be configured to hold two separate optical fibers. The output block 304 includes second glass tube 214 configured to hold a single fiber pigtailed output capillary 216. The single fiber pigtailed output capillary 216 can be configured to hold a single optical fiber.

The center block 302 includes a center glass tube 218 configured to hold a first inner glass tube 204 and a second inner glass tube 210. The first inner glass tube 204 can be configured to hold a first lens 206. Similarly, the second inner glass tube 210 can be configured to hold a second lens 212. A WDM filter 208 can be optically coupled between the first lens 206 and the second lens 212. For example, the WDM filter 208 can be secured to an end surface of the first inner glass tube 204 facing the surface curvature of the first lens 206.

In some implementations, the first and second lenses 206 and 212 can be C-lenses. Alternatively, the lenses 206 and 212 can be two GRIN lenses or a GRIN lens and a C-lens in combination. In addition, D-lenses or other lenses configured to fit in the WDM coupler 300 can be used. Furthermore any combination of the above lens types can be used.

A multiplexed signal having a plurality of wavelengths, e.g., $\lambda 1$, $\lambda 2$, $\lambda 3$, $\lambda 4$, $\lambda 5$, $\lambda 6$, $\lambda 7$, and $\lambda 8$, can be input into an input fiber 220 of the dual fiber pigtailed capillary 202 through a first port (Port 1). The light carrying the multiplexed signal output from an end of the capillary 202 is incident onto the lens 206. The lens 206 collimates the multiplexed signal output from the end of fiber 220. The collimated multiplexed signal is incident onto the WDM filter 208. The WDM filter 208 transmits light having a specified wavelength, (e.g., $\lambda 1$). The transmitted filtered collimated light having the specified wavelength can be focused by the second lens 212 to an end of a transmission fiber 224 of single fiber pigtailed capillary 216. Thus, a first output light signal having the specified wavelength is output from the transmission fiber 224 through a second port (Port 2).

A portion of the collimated multiplexed signal having one or more wavelengths other than the specified wavelength (e.g., $\lambda 2$, $\lambda 3$, $\lambda 4$, $\lambda 5$, $\lambda 6$, $\lambda 7$, and $\lambda 8$), is reflected by the WDM filter 208. The resulting reflected collimated light can be focused by the first lens 206 to an end of a reflection fiber 222 of the dual fiber pigtailed capillary 202. Thus, a second output light signal having one or more wavelengths is output from the reflection fiber 222 through a third port (Port 3).

Figure 4:
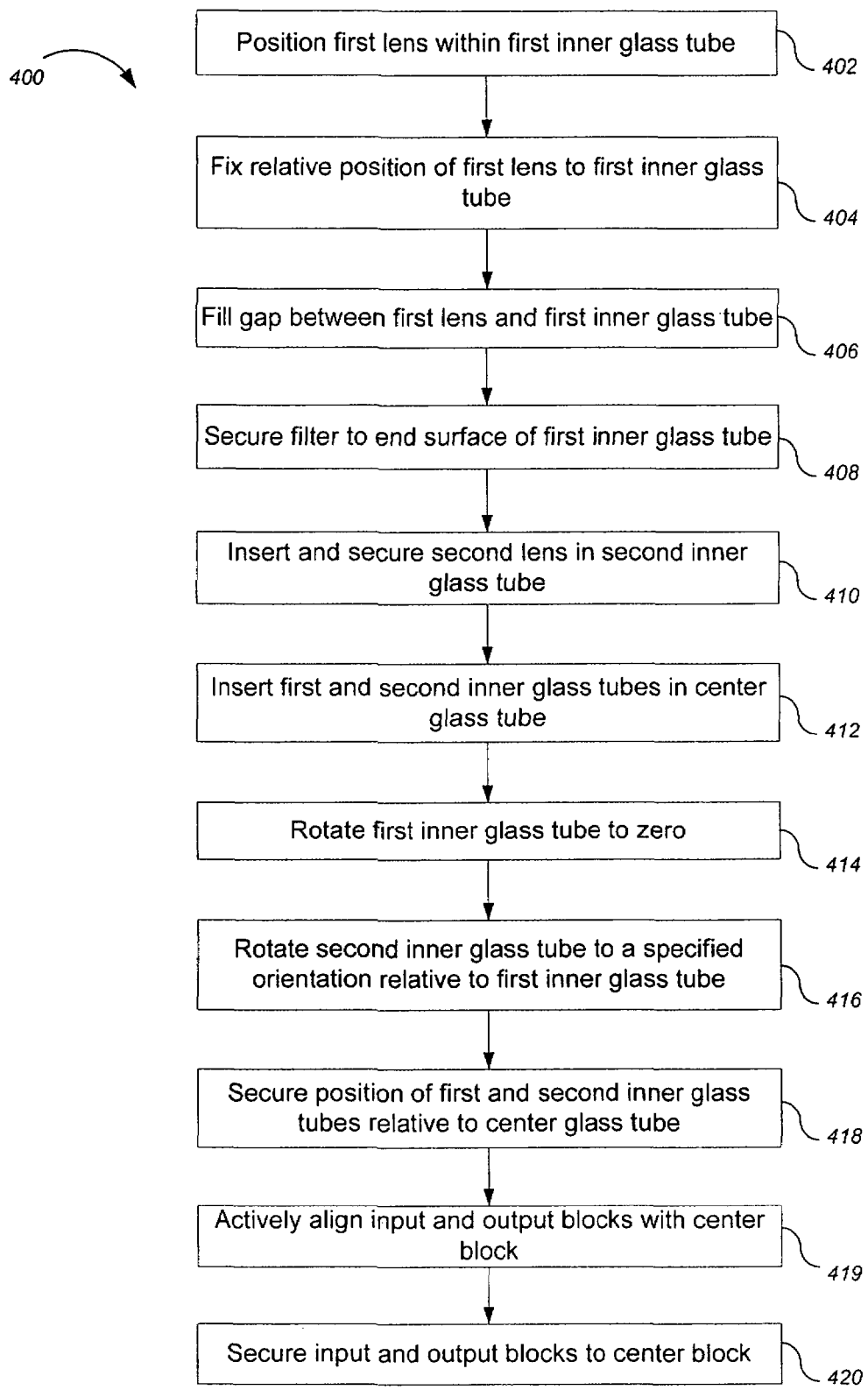
FIG. 4 is a flowchart showing an example method for forming the WDM coupler of FIG. 3.

FIG. 4 is a flowchart showing an example method 400 for forming a WDM coupler (e.g., the WDM coupler 300 of FIG. 3) including a center block (e.g., center block 302). The center block is assembled including positioning 402 a first lens (e.g., lens 206) within a first inner glass tube (e.g., first inner glass tube 204).

The relative position of the first lens to the first inner glass tube is fixed 404. The position can be fixed, for example, using a tool that determines a specified distance between a filter (e.g., the WDM filter 208) and first lens based on an end point of the first inner glass tube. The first lens is secured 406 within the first inner glass tube. Securing can include filling a gap between the first lens and the first inner glass tube (e.g., with epoxy).

For example, for a gap substantially from 0.0 to 30 μm, the epoxy is subject to a wicking process that can evenly spread the epoxy throughout the gap. Consequently, the first inner glass tube and the first lens can be positioned coaxial relative to one another. In some implementations, the gap between the first inner glass tube and the first lens can be configured to be substantially 10 μm, such that the wicking process can occur. Additionally, the wicking process can prevent epoxy from leaking into the optical surface of the first lens. In some implementations, the epoxy is UV cured (e.g., at room temperature).

The WDM filter is secured 408 to an end surface of the first inner glass tube holding the first lens. For example, the WDM filter can be secured to the first inner glass tube using UV cured epoxy. Alternatively, the WDM filter can be secured using an adhesive or other suitable attachment means.

A second lens (e.g., second lens 212) is positioned 410 in a second inner glass tube (e.g., second inner glass tube 210). The second lens can be secured in the second inner glass tube using epoxy in a similar manner as described above with respect to the first lens and the first inner glass tube.

When a filter is placed between two lenses, the filter changes a free-space light path between the lenses. In some implementations, the light path is simply shifted. However, when fibers and lens are angle-polished, the change of the light path can become complex. A result of the complex change is referred to as "walk-off", which increases insertion loss.

To overcome the walk-off effect (i.e., to minimize insertion loss) the fibers and lenses are rotated about the optical axis relative to each other. As a result, a similar effect can be achieved as changing the polished angles.

In some implementations, a theoretical light path analysis can be performed to find optimum orientations of the first lens 206 ($p$), second lens 212 ($q$), input capillary 202 ($r$), and output capillary 216 ($s$), in order to substantially minimize the insertion loss caused by the walk-off effect at the second and third ports substantially simultaneously. For example, light path analysis can be performed using an optical design software such as provided by Zemax.

Since the orientations of fibers and lenses are relative, p can be initially set to zero degrees, and the values of q, r, and s can be determined from the light path analysis. For example, the orientation of a lens is measured from the position when the lens is facing "up" (e.g., a short side on top and long side on bottom as shown in FIG. 2). The orientation of a capillary is measured from the position when the capillary is facing "down" (e.g., long side on top and short side on bottom as shown in FIG. 2).

Reducing insertion loss including rotating angle-polished lenses and angle-polished fibers can be applied to any devices having an angle-polished lens or multiple angle-polished lenses and an angle-polished fiber or multiple angle-polished fibers.

As shown in FIG. 4, the first inner glass tube and the second inner glass tube are inserted 412 into a center glass tube (e.g., center glass tube 218). The first inner glass tube is rotated 414 until the first lens is aligned at orientation p=0°. Similarly, the second inner glass tube is rotated 416 until the second lens is aligned at a specified orientation (e.g., a calculated value of q).

The positions of the first inner glass tube and the second inner glass tube are secured 418. In some implementations, epoxy is applied between the center glass tube and first and second inner glass tubes. In some implementations, the epoxy is subject to the wicking process described above. Additionally, the epoxy does not leak onto the WDM filter or the optical surfaces of the first and second lenses. Additionally, the UV curing can be used to preserve the rotational alignment between the components.

After the center block has been assembled and UV cured, the center block can be further treated including heating the center block for a specified time (e.g., at substantially 110° C. for substantially 1 hour). Heating the center block can enhance the stability of a WDM coupler in high temperature and humidity conditions.

An input block (e.g., input block 301), an output block (e.g., output block 304), and the center block can be aligned using an active alignment process 419. For example, the center block, first glass tube (e.g., first glass tube 200), and second glass tube (e.g., second glass tube 214) can be held on an assembling station. A dual fiber pigtailed capillary (e.g., dual fiber pigtailed capillary 202) can be inserted into the first glass tube, and a single fiber pigtailed capillary (e.g., single fiber pigtailed capillary 216) can be inserted into the second glass tube. The capillaries are initially positioned at specified orientations (e.g., r and s, respectively) following a theoretical analysis as described above. The orientations of capillaries are then fine-tuned in an active alignment to minimize insertion loss at both transmission and reflection ports.

The input block and output block are then secured 420 together with the center block to form the WDM coupler. After the active alignment process is performed to substantially minimized insertion loss at the second and third ports, the dual fiber pigtailed capillary and the single fiber pigtailed capillary are secured to the first tube and the second tube, respectively. The securing can be performed, for example, using an epoxy applied between the first tube and dual fiber pigtailed capillary, between second tube and single fiber pigtailed capillary, and between the ends of the first tube and the center tube and between the center tube and the second tube.

The applied epoxy is then cured (e.g., using UV light). Again, the epoxy curing can be performed without changing the alignment of the capillaries relative to center block. After the WDM coupler is assembled and cured, the whole WDM coupler can again be treated including heating the WDM coupler for a specified time (e.g., at 110° C. for 1 hour). The final thermal treatment can further enhance the stability of the WDM coupler in high temperature and humidity environments.

Figure 5:
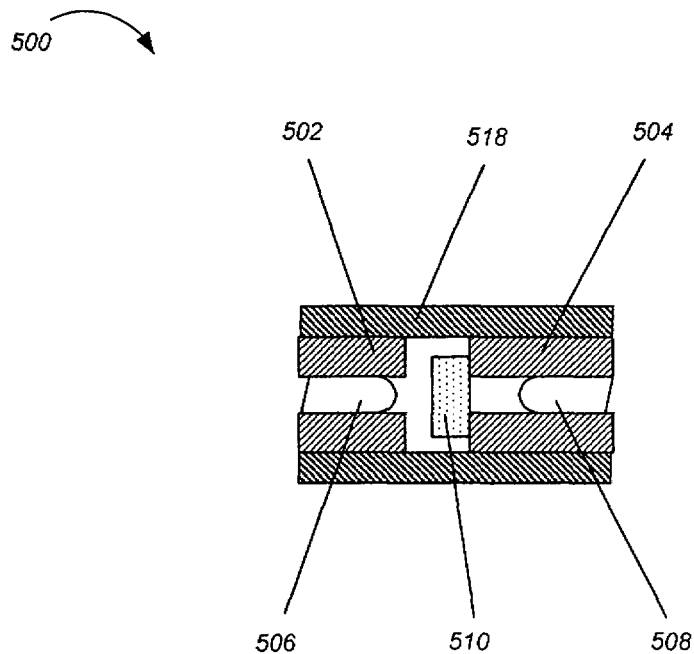
FIG. 5 is a block diagram of example center block of a WDM coupler.

FIG. 5 is a block diagram of another example center block 500. Center block 500 includes first inner tube 502, first lens 506, WDM filter 510, second lens 508, second inner tube 504, and outer tube 518. The first lens 506 is positioned within the first inner tube 502. Similarly, the second lens 508 is positioned within the second inner tube 504. The WDM filter 510 is secured to an end surface of the second inner glass tube 504. In some implementations, the first and second lenses 506 and 508 are positioned and secured within the first and second inner tubes 502 and 504 in a similar manner as described with respect to FIG. 4 above.

In some implementations, the WDM filter 510 can have a first side coated with an anti-reflective coating. Additionally, a second side of the WDM filter 510 can be coated with one or more thin films. The one or more thin films can provide the specified wavelength filtering of the WDM filter 510. In some implementations, the anti-reflective coating side of the WDM filter 510 is secured to the second inner glass tube 504, so that filter performance will not be affected because the thin films are not tinted by epoxy. In other implementations, the thin films side of the WDM filter 510 is secured to the second inner glass tube 504, so that the walk-off effect at Port 2 will be reduced because the thin films side is facing the second lens 508. The first and second inner glass tubes are positioned and secured within the outer tube 518 as described above.

Figure 6:
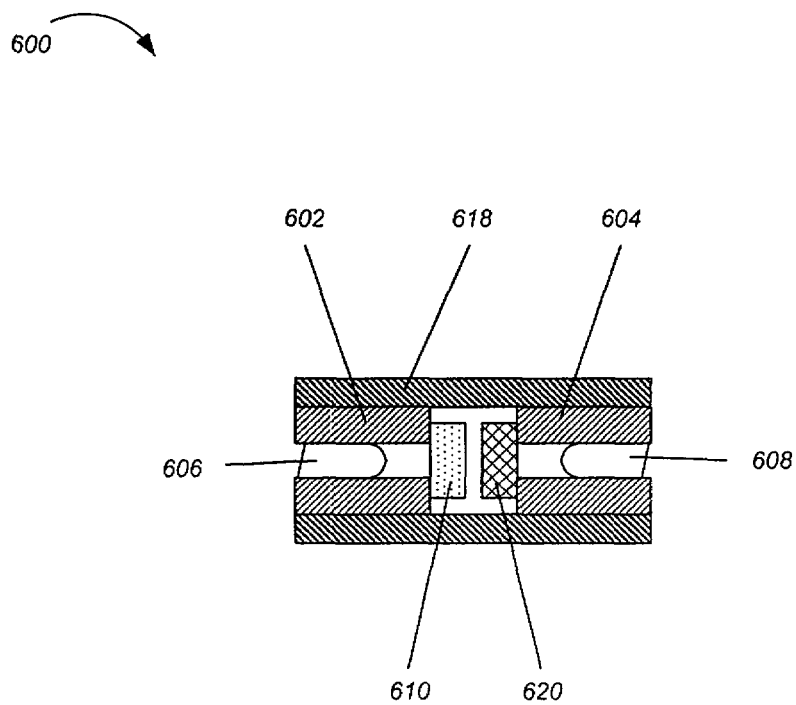
FIG. 6 is a block diagram of example center block of a WDM coupler.

FIG. 6 is a block diagram of another example center block 600. Center block 600 includes first inner tube 602, first lens 606, WDM filter 610, second lens 608, second inner tube 604, outer tube 618, and optical element 620. The first lens 606 is positioned within the first inner tube 602. Similarly, the second lens 608 is positioned within the second inner tube 604.

In center block 600, the WDM filter 610 is secured to a surface at an end of the first inner tube 602 such that the WDM filter 610 is positioned between the first and second inner tubes 602 and 604, respectively. The optical element 620 is affixed to a surface at the end of the second inner tube 610 such that the optical element 620 is also positioned between the first and second inner tubes 602 and 604. Additionally, the optical element 620 can be positioned such that the WDM filter 610 faces the optical element 620. Alternatively, the WDM filter 610 can be secured to the second inner tube 604 and the optical element 620 can be secured to the first inner tube 602. The first and second inner tubes 602 and 604 can be positioned and secured within the outer tube 618 to form the center block 600.

The optical element 620 can be a second WDM filter, an isolator, or other optical component. For example, when the optical element 620 is a second WDM filter, the cascaded filters allow the second filter to further filter the already filtered light stream that passes through the first filter, refining the filtering provided by the center block 600. Alternatively, when the optical element 620 is an isolator, the isolator can prevent reverse propagation of light through the center block 600. For example, a demultiplexing device using the center block 600 can have an incoming multiplexed signal passing through the first lens 606 to be incident on the filter 610. Using an isolator as the optical component 620 prevents a light stream from entering the center block through the second lens 608 and being incident on the WDM filter 610.

Figure 7:
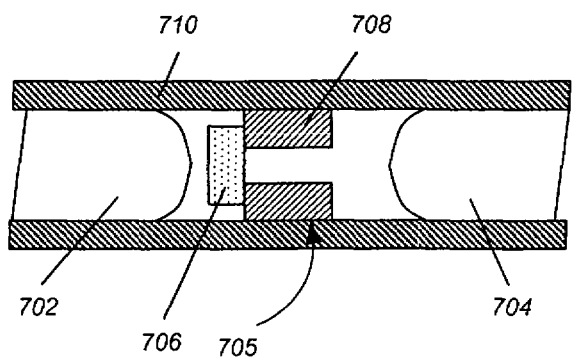
FIG. 7 is a block diagram of example center block of a WDM coupler.

FIG. 7 is a block diagram of an example center block 700. Center block 700 includes a first lens 702, a second lens 704, a filter assembly 705, and an outer tube 710. The filter assembly 705 includes a WDM filter 706, and inner tube 708. The WDM filter 706 is secured to an end surface of the inner tube 708. The first lens 702, inner tube 708, and second lens 704 are positioned and secured within the outer tube 710. In particular, the inner tube 708 is positioned between the first lens 702 and the second lens 704. In center block 700, the first lens 702 and second lens 704 are positioned and secured within the outer tube 710 instead of within separate inner tubes as in FIG. 6 above.

In some implementations, the inner tube 708 does not hold any optical components within the inner tube 708. Instead, the WDM filter 706 is affixed to an end of the inner tube 708. The inner tube 708 can be configured to fit within the outer tube 710 such that the WDM filter 706 can be positioned relative to the first lens 702 and second lens 704. In some implementations, the first lens 702, second lens 704 and inner tube 708 (with secured WDM filter 706) are not touching within the outer tube 710.

Figure 8:
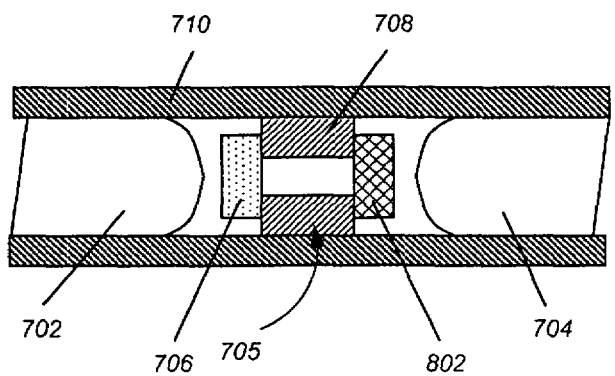
FIG. 8 is a block diagram of example center block of a WDM coupler.

FIG. 8 shows an example block diagram of a center block 800. The center block 800 is similar to the center block 700 of FIG. 7 and include first lens 702, second lens 704, filter assembly 705 including WDM filter 706 and inner tube 708, and outer tube 710.

Additionally, filter assembly 705 also includes an optical element 802. The optical element 802 can be secured to an end surface of the inner tube 708 (e.g., the opposite end of the inner tube 708 as the end securing the WDM filter 706). The optical element 802 can be a second WDM filter, an optical isolator, or another optical component.

The center block structures above can be used for a WDM coupler having multiple port configurations. For example, a three port multiplexing or demultiplexing device can include an input block having two ports and an output block having one port coupled to a center block to provide multiplexing or demultiplexing functionality. The coupler can be assembled in a similar manner as described with respect to FIG. 4 above. The number of ports can also be scaled. For example, a six port multiplexing/demultiplexing device can be provided.

Figure 9:
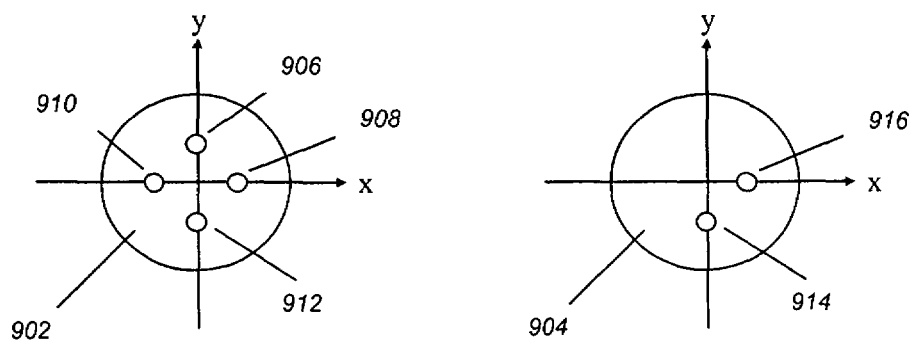
FIG. 9 shows an example input and output configuration for a six port WDM coupler.

FIG. 9 shows an input and output configurations for a six port device. FIG. 9 includes a cross section of an input capillary 902 and a cross section of an output capillary 904. The input capillary 902 holds input fiber 906 and reflection fiber 912 in the y-axis as well as an additional input fiber 910 and reflection fiber 908 in the x-axis. The output capillary 904 holds transmission fiber 914 in the y-axis and an additional transmission fiber 916 in the x-axis. In some implementations, each set of input, reflection, and transmission fibers are in separate planes. In some implementations, the separate planes are substantially perpendicular.

A six port WDM coupler is formed by providing input capillary 902 and output capillary 904 as input and output blocks to a center block configuration shown above. Thus, each center block configuration shown above can be configured to provide a six port WDM coupler. In a six port WDM coupler a first light stream is input to fiber 906, the filtered light is output from fiber 914, and the reflected light is output from fiber 912. Similarly, a second light stream is input to fiber 910, its filtered light is output from fiber 916, and the corresponding reflection light is output from fiber 908.

In some implementations, multiple-of-three ports can be provided. In a multiple-of-three port (e.g., six, nine, twelve, . . . ) coupler, the input capillary holds a plurality of input and reflection fibers, and the output capillary holds corresponding plurality of transmission fibers. Each set of input, reflection, and transmission fibers are on a plane separate from other sets on other planes.

Figure 10:
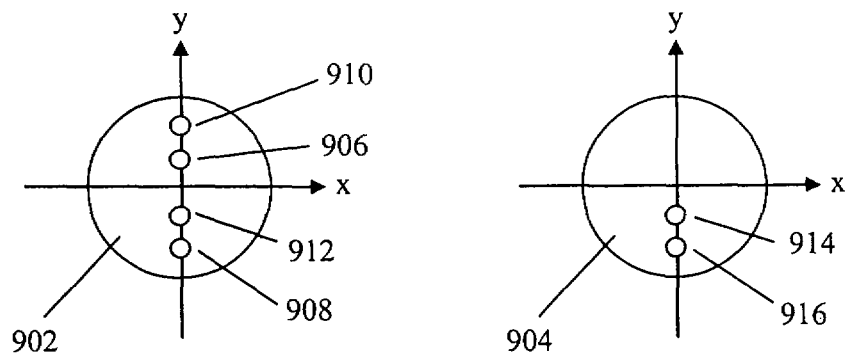
FIG. 10 shows an example cross section of an input capillary and a corresponding cross section of an output capillary.

Alternatively, all fibers can be in a same plane. FIG. 10 shows an example cross section of an input capillary 1002 and a corresponding cross section of an output capillary 1004. All fibers held by input capillary 1002 and output capillary 1004 are in the in the same plane (e.g., the y-axis) of the cross sections. The input capillary 1002 holds input fiber 906 and reflection fiber 912 in the y-axis and input fiber 910 and reflection fiber 908 also in the y-axis. The output capillary 1004 holds transmission fiber 914 in the y-axis and an additional transmission fiber 916 in the y-axis In some implementations, multiple-of-three ports can also be provided. In a multiple-of-three port (e.g., six, nine, twelve, . . . ) coupler, the input capillary holds a plurality of input and reflection fibers, and the output capillary holds corresponding plurality of transmission fibers. All fibers are substantially in the same plane.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A wavelength division multiplexing (WDM) coupler comprising:
    an input block including a first tube, the first tube holding an input dual fiber pigtailed capillary, the capillary holding an input fiber and a reflection fiber;
    a center block including a center tube holding a first inner tube and a second inner tube, the first inner tube holding a first lens within the first inner tube and the second inner tube holding a second lens within the second inner tube, the center block further including a WDM filter positioned between the first lens and the second lens and secured to the end surface of the first inner tube and an optical component positioned between the first lens and the second lens and secured to the end surface of the second inner tube; and
    an output block including a second tube holding an output single fiber pigtailed capillary, the capillary holding a transmission fiber,
    where the coupler inputs a signal from the input fiber, and outputs the transmitted signal through the transmission fiber and the reflected signal through the reflection fiber.

2. The coupler of claim 1, where the input capillary, the output capillary, the first lens, and the second lens have different rotational orientations about an optical axis.

3. The coupler of claim 1, where the first and second lenses are selected from a group consisting of C-lens, GRIN lens, D-lens, and lenses geometrically configured to fit within the lens holding inner tube.

4. The coupler of claim 1, where the WDM filter includes a first side including one or more film coatings and a second side and where the first or second side of the WDM filter is secured to the end surface of the first inner tube.

5. The coupler of claim 1, where the WDM filter includes a first side including one or more film coatings and a second side and where the first or second side of the WDM filter is secured to the end surface of the second inner tube.

6. The coupler of claim 5, the center block further comprising an optical component coupled between the first inner tube and the WDM filter.

7. The coupler of claim 1, where the optical component is a second WDM filter.

8. The coupler of claim 1, where the optical component is an optical isolator.

9. The coupler of claim 1, where the first lens or second lens includes an angle-polished flat surface.

10. A wavelength division multiplexing (WDM) coupler, comprising:
    an input block including a first tube, the first tube holding an input dual fiber pigtailed capillary, the capillary holding an input fiber and a reflection fiber;
    a center block including a center tube holding a first lens, a second lens, and a filter assembly, the filter assembly including an inner tube and a WDM filter wherein the WDM filter is secured to a first end surface of the inner tube and wherein an optical component is secured to a second end surface of the inner tube, the inner tube of the filter assembly positioned within the center tube between the first lens and the second lens; and
    an output block including a second tube holding an output single fiber pigtailed capillary, the capillary holding a transmission fiber.

11. The coupler of claim 10, where the input capillary, the output capillary, the first lens, and the second lens have different rotational orientations about an optical axis.

12. The coupler of claim 10, where the first lens, the second lens, and the filter assembly are positioned in the center tube without contacting each other.

13. The coupler of claim 10, where the optical component is a second WDM filter.

14. The coupler of claim 10, where the optical component is an optical isolator.

15. The coupler of claim 10, where the first and second lenses include an angle-polished flat surface.

16. A method comprising:
    forming a center block comprising:
        positioning a first lens within a first tube;
        positioning a second lens within a second tube;
        securing a filter to an end surface of the first tube;
        securing an optical component to an end surface of the second tube; and
        positioning the first tube and the second tube within a center tube including adjusting the relative positions of the first tube and the second tube, the adjusting including rotating the position of the first tube and the second tube to distinct orientations relative to an optical axis.

17. The method of claim 16, further comprising actively aligning an input block and an output block with the center block.

18. A method comprising:
    positioning an inner tube within an outer tube of a center block, the inner tube including a WDM filter and an optical component wherein the WDM filter is secured to a first end surface of the inner tube and the optical component is secured to a second end surface of the inner tube;
    positioning a first lens within the outer tube facing a first end of the inner tube;
    positioning a second lens within the outer tube facing a second end of the inner tube; and
    adjusting the relative positions of the first lens and the second lens, the adjusting including rotating the position of the first lens and the second lens to distinct orientations relative to an optical axis.

* * * * *